(No Model.)

J. SMITH.
APPLIANCE FOR STAVING OR SHRINKING TIRES.

No. 539,490. Patented May 21, 1895.

UNITED STATES PATENT OFFICE.

JAMES SMITH, OF MERCERSBURG, PENNSYLVANIA.

APPLIANCE FOR STAVING OR SHRINKING TIRES.

SPECIFICATION forming part of Letters Patent No. 539,490, dated May 21, 1895.

Application filed September 17, 1894. Serial No. 523,264. (No model.)

*To all whom it may concern:*

Be it known that I, JAMES SMITH, a citizen of the United States, residing at Mercersburg, in the county of Franklin and State of Pennsylvania, have invented certain new and useful Improvements in Appliances for Staving or Shrinking Tires; and I do hereby declare the following to be a full, clear, and exact description of the invention, such as will enable others skilled in the art to which it appertains to make and use the same.

This invention relates to appliances for staving or shrinking tires and in its simplest form is an attachment to be applied to an anvil of ordinary construction.

The improvement consists of a plate or bar constituting a bed, clamping levers to hold the tire in place on the bed during the staving or shrinkage process, and a rest for the clamping levers when not in use.

For a full understanding of the invention, reference is to be had to the following description and claims, in connection with the annexed drawings, in which—

Figure 1:
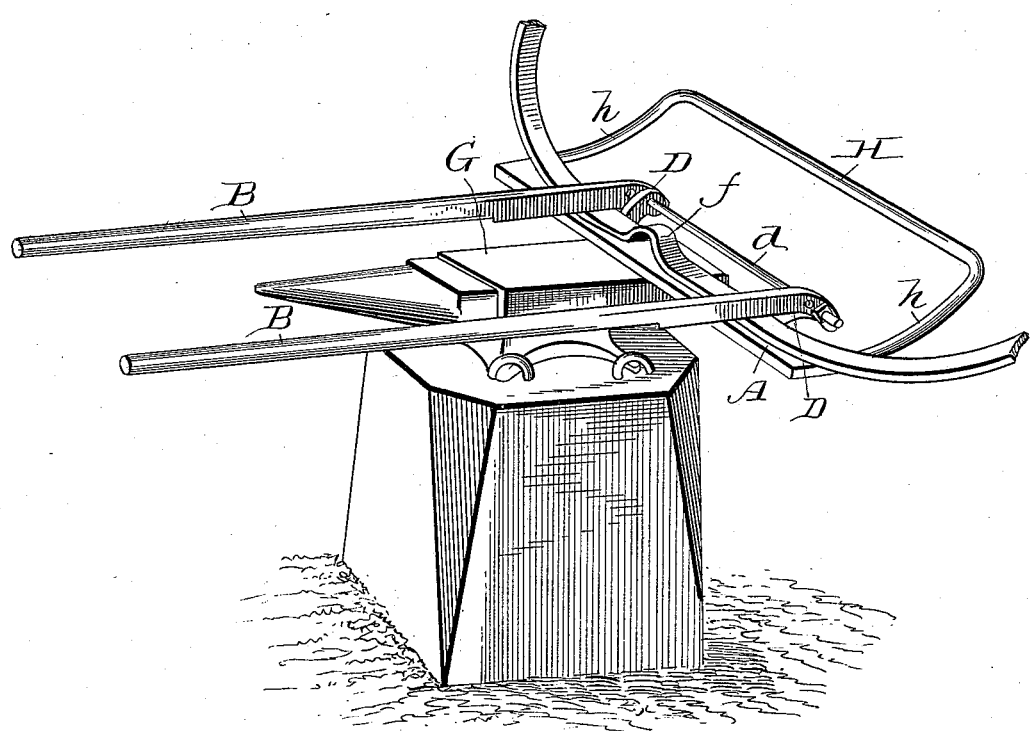
Figure 2:
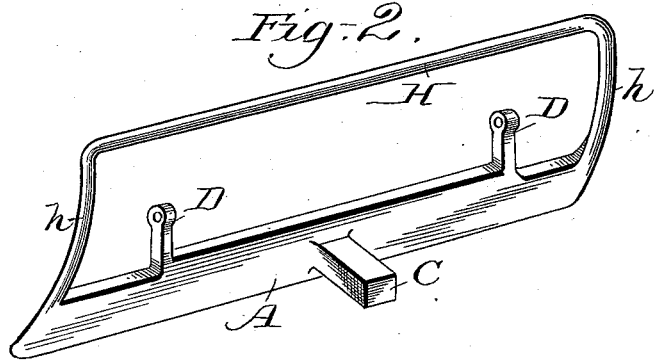

Figure 1 is a perspective view showing the application of the invention. Fig. 2 is a detail view of the bed, showing the tang by means of which connection is had with the anvil.

The bar or plate A constituting the bed of the device is of proper length and stiffness to sustain the tire while it is being staved. A tang C is pendent from the lower side and is designed to form means of attachment between the device and an anvil G, the latter having the usual vertical opening in its heel to receive the tang. Arms D project from the rear edge of the bed in parallel relation and support a rod $d$ on which levers B are mounted. The rear ends of the clamping levers B are curved downward and provided with a series of openings through which the ends of the rod $d$ pass to adjustably connect the levers with the said arms. A rest H is provided for the levers B when thrown back by means of a rod which extends approximately parallel with the bed and has its ends bent and secured to the bed. The bent ends $h$ incline upward to bring the rest H in a higher plane than the bed A.

The operation of the invention is as follows: A tire to be staved or shrunk is heated to a welding point and bent or kinked over the horn of the anvil as shown at $f$ and placed upon the bed in such a manner as to have the kink directly above the anvil. The clamping levers are turned down over the tire, one on each side of the kink, and secure the tire upon the bed. The staving or shrinking process is now performed by hammering the kink $f$ until it is flattened upon the bed. The tire being held immovable on each side of the kink by means of the levers B, it will be seen that the tire is thickened at the point of staving.

Having thus described the invention, what is claimed as new is—

1. A tire staving appliance comprising a bed, clamping levers near each end of the bed, and a rest integral with the bed for supporting the levers when thrown back, substantially as specified.

2. A tire staving attachment comprising a bed having a pendent tang and rear arms, clamping levers adjustably connected with the arms, and a rest for the clamping levers attached to the bed, substantially as specified.

In testimony whereof I have signed this specification in the presence of two subscribing witnesses.

JAMES SMITH.

Witnesses:
W. C. SHAFFER,
J. G. HOLLINGER.